(12) United States Patent
Hammerquist

(10) Patent No.: US 8,089,034 B2
(45) Date of Patent: Jan. 3, 2012

(54) MECHANISM FOR FOLDING, SWEEPING, AND LOCKING VEHICLE WINGS ABOUT A SINGLE PIVOT

(75) Inventor: Robert E. Hammerquist, Brooklyn, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 341 days.

(21) Appl. No.: 12/425,844

(22) Filed: Apr. 17, 2009

(65) Prior Publication Data
US 2010/0264260 A1    Oct. 21, 2010

(51) Int. Cl.
*F42B 10/00* (2006.01)
(52) U.S. Cl. .......................... 244/3.28; 244/3.27; 244/49
(58) Field of Classification Search ................ 244/45 R, 244/46, 49, 3.27, 3.28, 3.29; 446/62
See application file for complete search history.

(56) References Cited

U.S. PATENT DOCUMENTS

| | | | |
|---|---|---|---|
| 2,392,506 A * | 1/1946 | Rossmann | 244/49 |
| 2,752,110 A * | 6/1956 | Peterson | 244/218 |
| 3,415,467 A * | 12/1968 | Barringer | 244/3.29 |
| 3,469,806 A * | 9/1969 | Olchawa | 244/46 |
| 3,559,924 A * | 2/1971 | Jochner | 244/46 |
| 3,916,560 A * | 11/1975 | Becker | 446/62 |
| 4,132,374 A | 1/1979 | Abell | |
| 2008/0093501 A1 | 4/2008 | Miller et al. | |

* cited by examiner

*Primary Examiner* — Timothy D Collins
*Assistant Examiner* — Jamie S Stehle
(74) *Attorney, Agent, or Firm* — RatnerPrestia

(57) ABSTRACT

A wing pivot mechanism that is configured to pivot two wings about a single pivot axis of a vehicle, such as an aircraft. The wing pivot mechanism includes a hub, a set of gears positioned at least partially within an interior region of the hub, and two wings that are rotatably connected to the hub. Each wings includes a gear surface extending therefrom. Each gear of the hub assembly engages a gear of a respective wing such that rotation of the gears of the hub assembly causes rotation of the gears of the wings and pivoting of the wings about the single pivot axis in opposite rotational directions between a stowed position and a deployed position. A releasable locking mechanism is provided for locking the wings in a fixed rotational position in both the deployed position and the stowed position.

11 Claims, 9 Drawing Sheets

MECHANISM FOR FOLDING, SWEEPING, AND LOCKING VEHICLE WINGS ABOUT A SINGLE PIVOT

TECHNICAL FIELD

The present invention relates to a mechanism for pivoting the wings of a vehicle, such as an aircraft, about a single pivot axis.

BACKGROUND OF THE INVENTION

A variable-sweep wing is a wing of an aircraft, missile or unmanned vehicle that is capable of being swept back, i.e., rotated with respect to the fuselage of the vehicle, in flight or while stationary. In use, the wing is swept back for storage, carriage, and/or cruising at high speeds; while the wing is unswept for flight operation, specifically at low speeds, take-off and landing. The variable-sweep wing has been used primarily in military vehicles for performance enhancement and/or storage and carriage considerations.

Several variable-sweep wing configurations are known. In a twin-pivot configuration, the wings of an aircraft pivot about their individual pivot axes. F-14 and F-111 aircrafts incorporate twin-pivot style wings, for example. The aircraft wing beam structure is interrupted by two pins which are joined by a structural box. When swept, the wing beam structure cannot completely overlap because the pins are separated by a predetermined axial distance, spanwise, across the fuselage.

In a single pivot oblique configuration, such as that disclosed in U.S. Pat. No. 4,132,374, which is incorporated by reference herein, an oblique wing is provided in the form of a continuous beam mounted to the aircraft. The asymmetric nature of deploying an oblique wing in flight introduces aerodynamic imbalances that may be problematic for flight control during wing extension.

In a single-point pivot concentric shaft configuration, a single-point pivot concentric shaft pivots two wings about a single axis. The concentric shafts penetrate the fuselage and are relatively complex to operate and manufacture.

Variable-sweep wings may include a flexible membrane that is inflated or extended by an articulating skeleton to sweep the wings. Such a flexible membrane may lack structural integrity or be perceived to lack structural integrity, as compared with rigid wings.

While several variable-sweep wing configurations are known, there is a continuing need to develop and improve upon variable-sweep wings in the interest of structural integrity, performance and cost, for example.

SUMMARY OF THE INVENTION

According to one aspect of the invention, a wing pivot mechanism that is configured to pivot two wings about a single pivot axis of a vehicle is disclosed. The vehicle may be an aircraft or a watercraft, for example. The wing pivot mechanism comprises a hub assembly including a hub defining a hollow interior region and a set of gears positioned at least partially within the interior region of the hub. Two wings are rotatably connected to the hub assembly. Each wing includes a gear surface and each gear of the hub assembly is configured to engage a gear of a respective wing such that rotation of the gears of the hub assembly causes rotation of the gears of the wings and pivoting of the wings in opposite rotational directions about the single pivot axis between a stowed position and a deployed position. A releasable locking mechanism is provided for locking the wings in a fixed rotational position in both the deployed position and the stowed position.

BRIEF DESCRIPTION OF THE FIGURES

The invention is best understood from the following detailed description when read in connection with the accompanying drawing. Included in the drawing are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 1A:
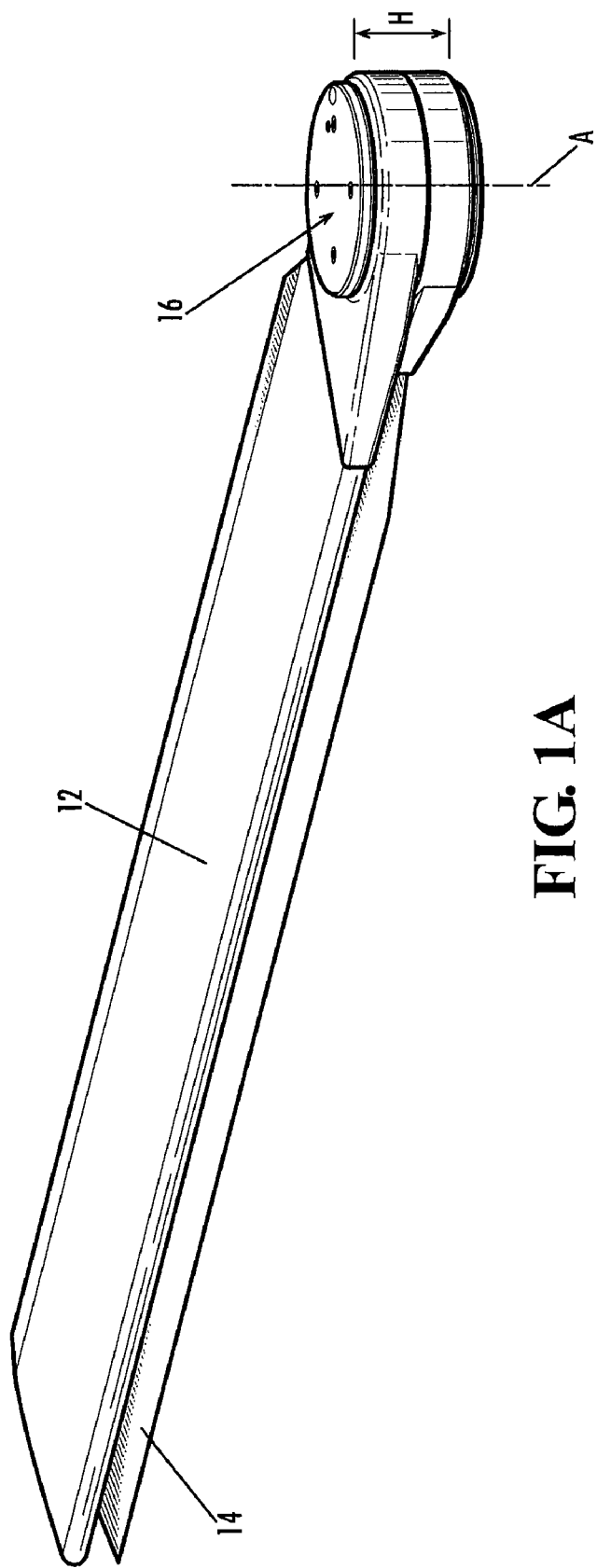
FIGS. 1A and 1B depict top, front and right side perspective views of a pivoting wing assembly, wherein the pivoting wing assembly is depicted in a stowed configuration in FIG. 1A and the pivoting wing assembly is depicted in a deployed configuration in FIG. 1B.
Figure 1B:
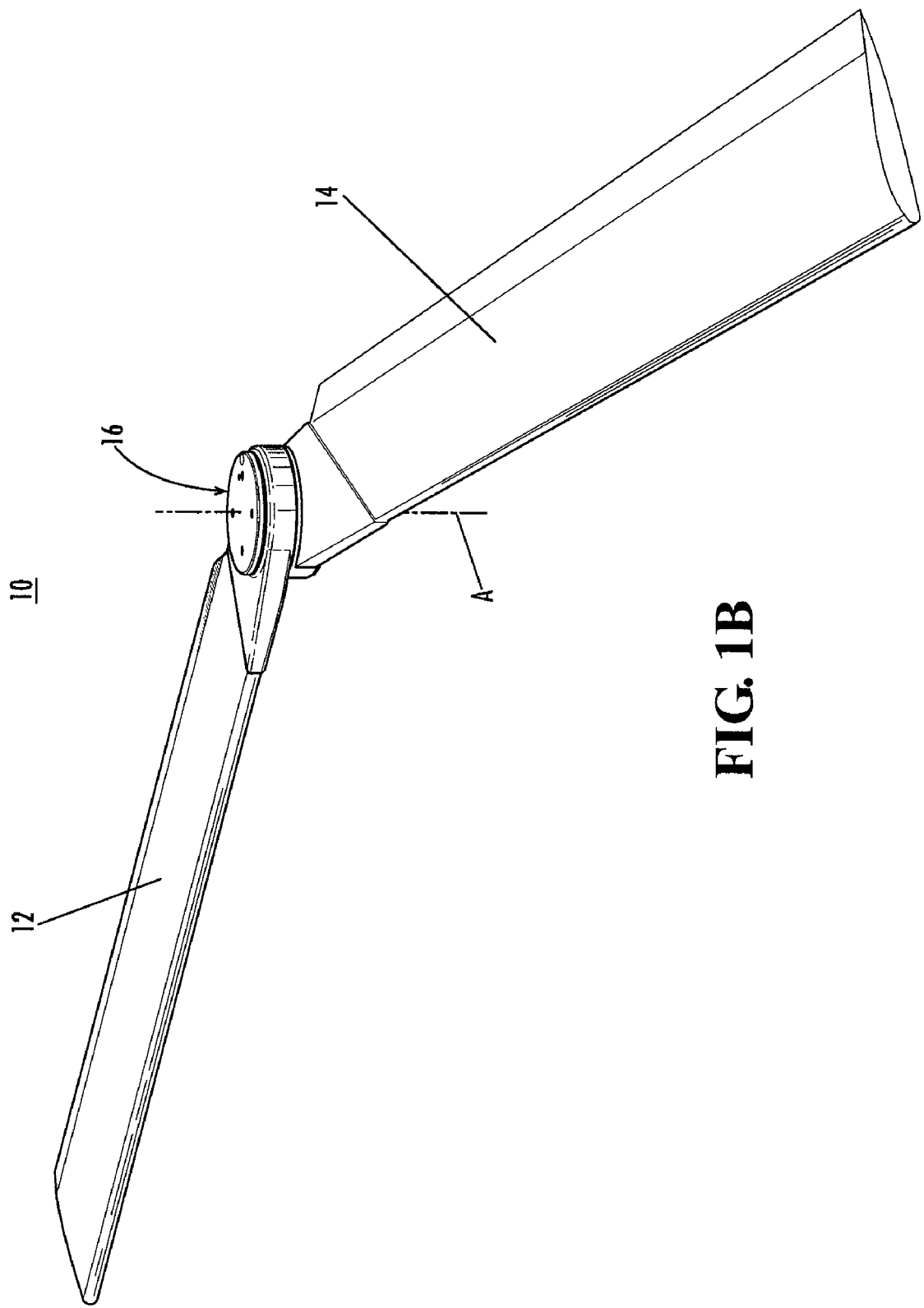

FIGS. 1A and 1B depict top, front and right side perspective views of a pivoting wing assembly, wherein the pivoting wing assembly is depicted in a stowed configuration in FIG. 1A and the pivoting wing assembly is depicted in a deployed configuration in FIG. 1B. In the figures the pivoting wing assembly is denoted by the numeral '10,' and may be referred to hereinafter as wing assembly 10 or assembly 10. The wing assembly 10 incorporates an all-in-one release, timing and lock assembly and these functions, as opposed to conventional wing assemblies, occupy no additional internal fuselage volume of a vehicle.

The wing assembly 10 generally includes a first wing 12, a second wing 14, and a hub assembly 16. Although not explicitly shown, hub assembly 16 includes provisions for rigid mounting to a fuselage of a vehicle (such as an aircraft or watercraft). Wings 12 and 14 pivot in opposite rotational directions about a single pivot axis 'A' between a stowed configuration (FIG. 1A) and a deployed configuration (FIG. 1B). In the stowed configuration, wings 12 and 14 are positioned on top of one another, whereas in the deployed configuration the distal ends (i.e., distal from hub assembly 16) of the wings are separated.

Hub assembly 16 has a low profile design. The overall height dimension 'H' of hub assembly 16 is slightly larger than the combined thickness of both wings 12 and 14.

Accordingly, hub assembly 16 occupies only the airfoil thickness and chord width at the proximal ends of wings 12 and 14, which is particularly advantageous from an aerodynamic perspective.

Figure 2:
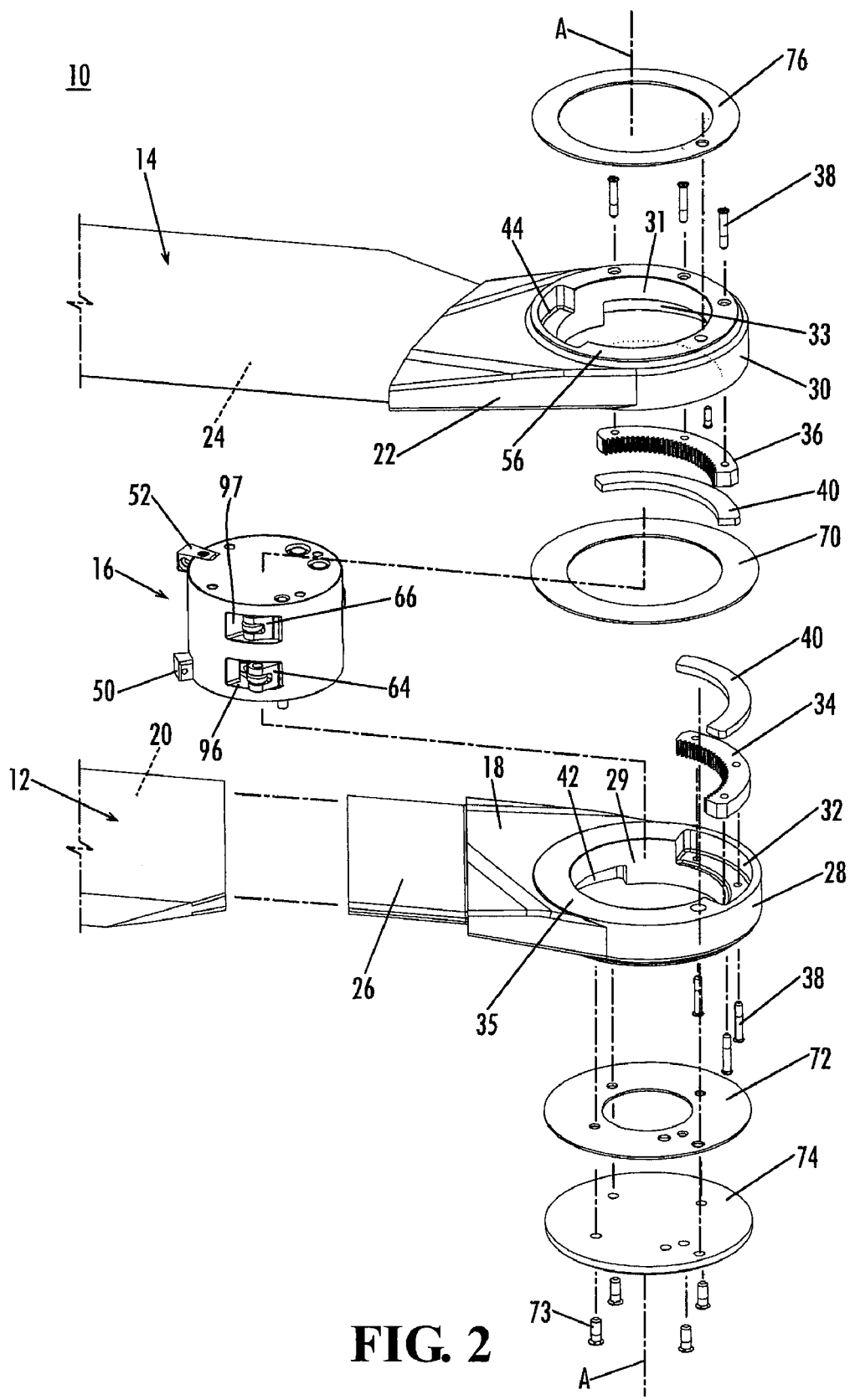
FIG. 2 depicts a bottom, rear and left side partially exploded perspective view of the wing assembly of FIG. 1A.
Figure 3:
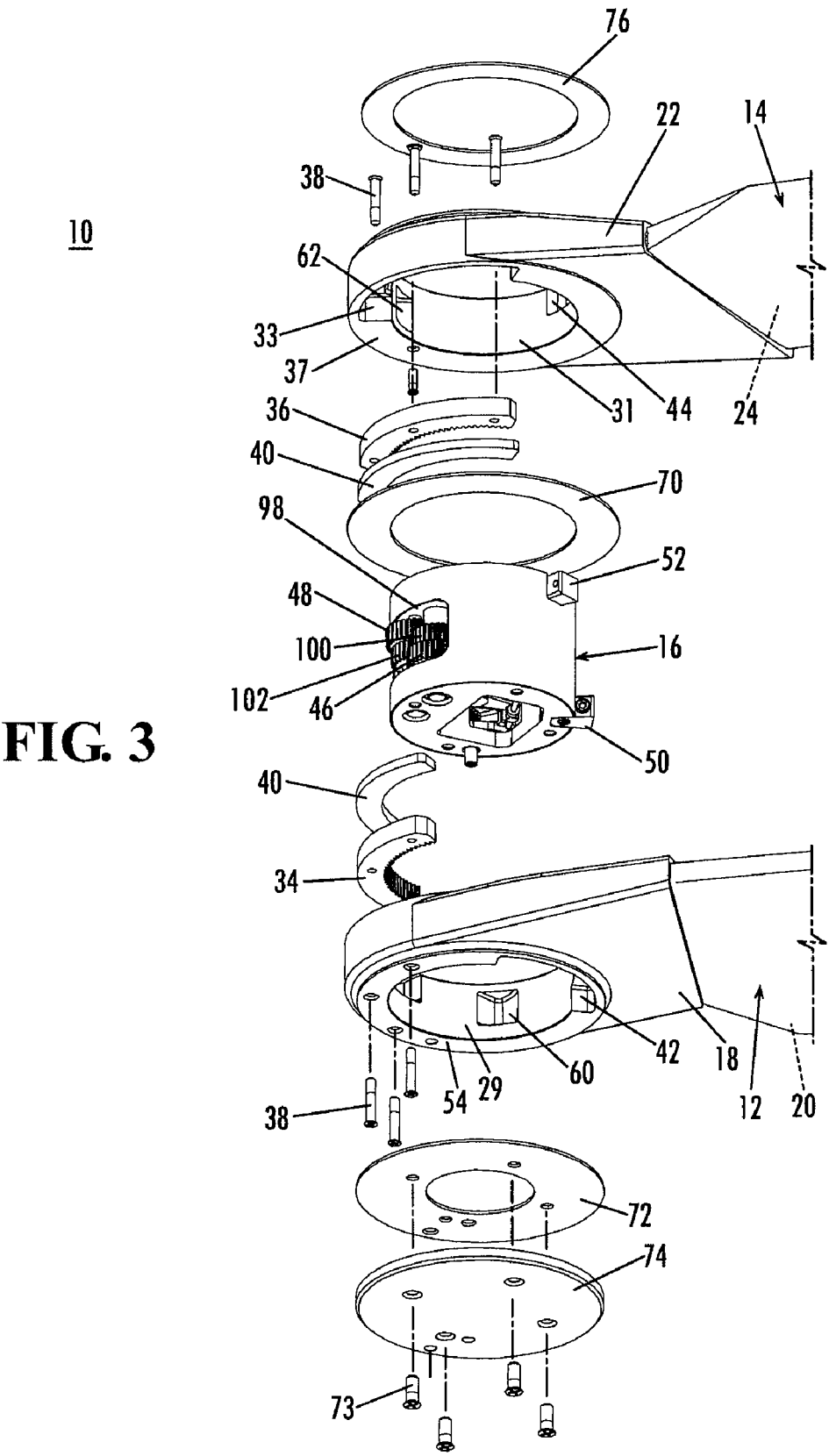
FIG. 3 depicts a top, front and right side partially exploded perspective view of the wing assembly of FIG. 2.

FIGS. 2 and 3 depict partially exploded perspective views of wing assembly 10. Only a portion of wings 12 and 14 are illustrated in FIGS. 2 and 3. A wing root 18 and 22 forms part of each wing 12 and 14, respectively. Wings 12 and 14 are joined to wing roots 18 and 22 by a mortise and tenon joint. More particularly, as shown in FIG. 2, each wing 12 and 14 includes a mortise 20 and 24 (i.e., a female opening defined on an interior surface of the end of the wing) that is configured to be either fixedly or removably connected to a tenon 26 (i.e., a male protrusion) of wing root 18 and 22, respectively. Those skilled in the art will recognize that a variety of ways exist to couple wing roots 18 and 22 to wings 12 and 14, respectively.

Although not shown, the wing and the wing root may be embodied as one unitary component. It should be understood by those skilled in the art that the geometry of wings 12 and 14 may vary from that shown in the figures and may be tailored for air flight or underwater applications, for example.

The proximal ends 28 and 30 of each wing roots 18 and 22 are configured for mounting to hub assembly 16. Proximal ends 28 and 30 of wing roots 18 and 22 each include a cylindrical aperture 29 and 31, respectively, that is sized to accommodate the cylindrical body of hub assembly 16. The longitudinal axis of apertures 29 and 31 are aligned to form the pivot axis 'A' of the assembly 10.

Radially-extending arcuate slots 32 and 33 are provided in wing roots 18 and 22 for receiving arcuate-shaped gears 34 and 36, respectively. Arcuate slot 32 is formed in top surface 35 (FIG. 2) of wing root 18 and is defined along a radial portion of the circumference of aperture 29. Arcuate slot 33 is formed in bottom surface 37 (FIG. 3) of wing root 22 and is defined along a radial portion of the circumference of aperture 31. Slots 32 and 33 of wing roots 18 and 22 are sized for receiving arcuate-shaped gears 34 and 36, respectively. Each arcuate-shaped gear 34 and 36 includes gear teeth that are defined on its entire interior surface. In an assembled form, gears 34 and 36 are positioned to engage gears 46 and 48, respectively, that are mounted to hub assembly 16 (see FIG. 5) such that rotation of gears 46 and 48 causes rotation of gears 34 and 36 which causes wings 12 and 14 to simultaneously rotate in opposite rotational directions about pivot axis 'A.'

Three fasteners 38 are provided for fixedly mounting each gear 34 and 36 in its respective slot 32 and 33, respectively. Two arcuate-shaped plates 40 are mounted over gears 34 and 36. Plates 40 are optional components of wing assembly 10 and may be integrated with gears 34 and 36. Moreover, in lieu of gear 34, gear 36, fasteners 38 and plates 40, gear teeth may be integrally formed on the cylindrical surface of each aperture 29 and 31 to achieve substantially the same result with fewer parts.

Slot 42 is formed in bottom surface 54 (FIG. 3) of wing root 18 and is defined along a radial portion of the circumference of aperture 29. Slot 44 is formed in top surface 56 (FIG. 2) of wing root 22 and is defined along a radial portion of the circumference of aperture 31. In an assembled form of wing assembly 10, rotational stops 50 and 52 are positioned within slots 42 and 44 that are formed in wing roots 18 and 22 to limit rotation of wings 12 and 14, respectively, beyond a certain point. As wings 12 and 14 rotate about pivot axis 'A,' stops 50 and 52, which are fixed in place, eventually abut a terminal end of a slot 42 and 44, thereby preventing further rotation of the wings 12 and 14, respectively, in that rotational direction. Further details of stops 50 and 52 and slots 42 and 44 are described with reference to FIGS. 5-6C.

Referring now to FIG. 3, recesses 60 and 62 are formed on the cylindrical surface of apertures 29 and 31 of wing roots 18 and 22, respectively. Each recess 60 and 62 has a substantially triangular cross-sectional shape (see FIGS. 5-6C) that is sized to releasably receive the body of a latch 64 and 66. A latch may also be referred to herein or in the art as a sear, a catch or a lock, and may also be referred to herein as a releasable locking mechanism. Upon engagement between latch 64 and recess 60 and/or engagement between latch 66 and recess 62, wings 12 and 14 are prevented from rotating about the pivot axis. Further details of the engagement between latches 64 and 66 and recesses 60 and 62 are described with reference to FIGS. 5-6C.

A cylindrical bearing plate 70 is sandwiched between bottom surface 37 of wing root 22 and top surface 35 of wing root 18 to enhance rotation of wings 12 and 14 about pivot axis 'A.' Bearing plate 70 may be fixedly mounted to either bottom surface 37 of wing root 22 or top surface 35 of wing root 18, or bearing plate 70 may be merely positioned therebetween. Two plates 72 and 74 are mounted to bottom surface 54 of wing root 18 by one or more fasteners 73. Another plate 76 is mounted to top surface 56 of wing root 22. Plates 72, 74 and 76 enclose hub assembly 16 to prevent or minimize dirt and debris from entering hub assembly 16.

Figure 4:
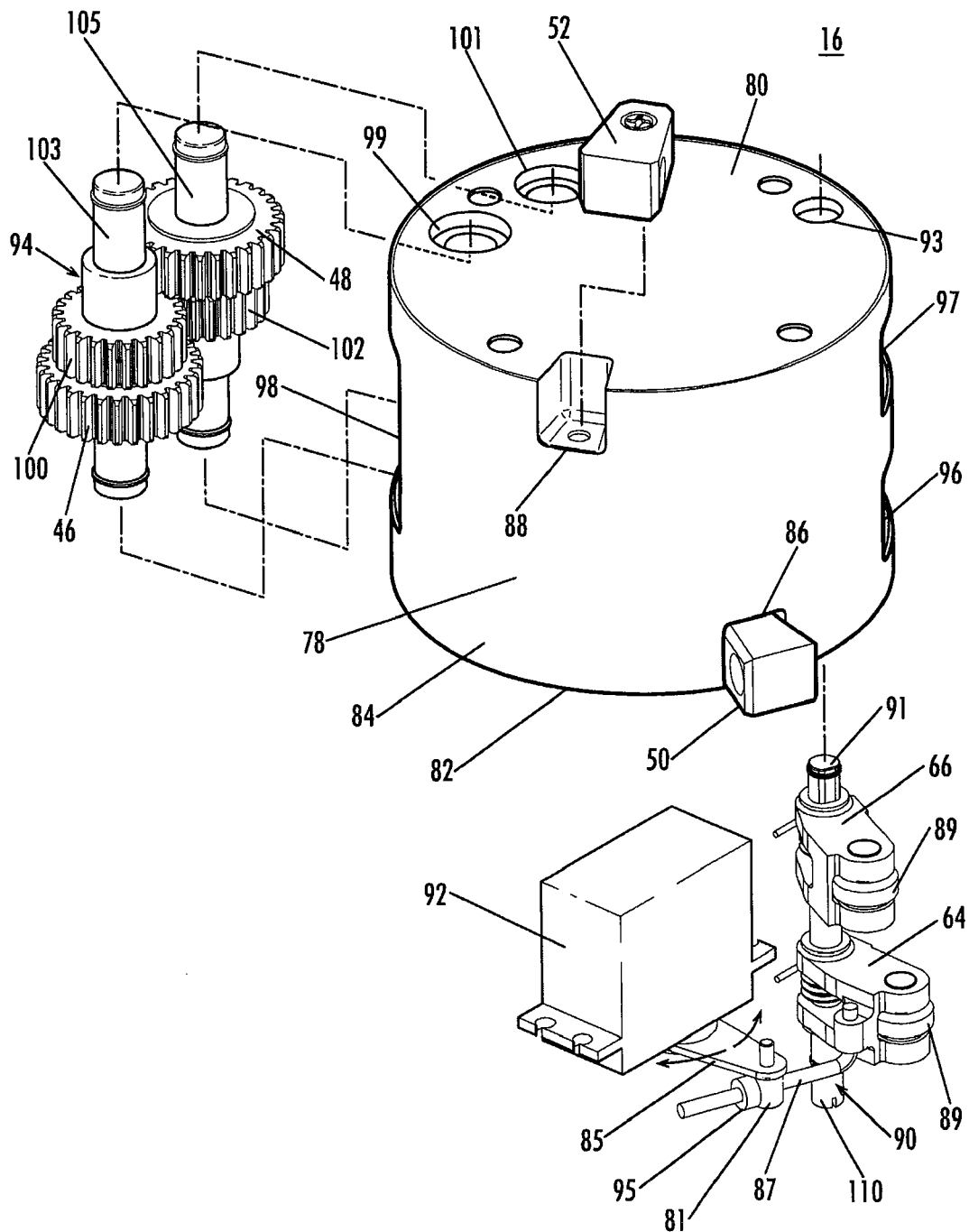
FIG. 4 depicts an exploded perspective view of a hub assembly of the wing assembly of FIG. 1A.

FIG. 4 depicts an exploded perspective view of hub assembly 16. The components of hub assembly 16 are configured to controllably pivot wings 12 and 14 in opposite rotational directions about pivot axis 'A.' Hub assembly 16 provides improved structural continuity and a large bearing area over which flight loads can be transferred efficiently from the wings to the fuselage (not shown).

Hub assembly 16 generally includes a hub 78, a latch assembly 90 for locking wings 12 and 14 in a fixed rotational position, an actuator 92 for unlocking the latch assembly 90 to release wings 12 and 14 from a locked configuration, and a gearing assembly 94 for engaging gears 34 and 36 of wings 12 and 14 to pivot wings 12 and 14, respectively, about pivot axis 'A.' The interior of hub 78 is substantially hollow to at least partially accommodate latch assembly 90, actuator 92 and gearing assembly 94.

Hub 78 of hub assembly 16 includes a planar top surface 80, a planar bottom surface 82 and a cylindrical surface 84. Recesses 86 and 88 are formed on surfaces 82 and 80 of hub 78 for receiving stops 50 and 52, respectively. Stops 50 and 52 are fixedly mounted within recesses 86 and 88, respectively, by one or more fasteners (not shown). Alternatively, stops 50 and 52 may be integrally formed with hub 78. The interior of hub 78 is substantially hollow to accommodate latch assembly 90, actuator 92 and gear assembly 94. Two apertures 96 and 97 (see also FIG. 2) are disposed in cylindrical surface 84 of hub 78 through which latches 64 and 66 partially extend, respectively. An aperture 98 (see also FIG. 3) is disposed on cylindrical surface 84 of hub 78 through which gears 46 and 48 of gearing assembly 94 partially extend.

Latch assembly 90 includes two latches 66 and 64 are that are mounted to a cylindrical shaft 91. Latch 64 is spring loaded and is capable of resiliently rotating about shaft 91. Latch 66 is keyed to shaft 91, and is not capable of resiliently rotating about shaft 91. In use, rotation of shaft 91 causes latch 66 to rotate along with the shaft 91 while latch 64 remains fixed in position, the purpose of which will be described later. Each end of shaft 91 is mounted through a hole 93 (one shown) defined on top surface 80 and bottom surface 82 of hub 78. Applying a force to a latch causes it to rotate from its initial position in a clockwise or counter-clockwise direction about shaft 91. The latch returns to its initial position upon removal of that force. Latches 64 and 66 include roller bearings 89 for rolling across the cylindrical interior surface of apertures 29 and 31 of the wing roots 18 and 22, respectively. Roller bearings 89 also allow latches 64 and 66 to efficiently roll in and out of recesses 60 and 62 under an applied load.

Actuator 92 is fixedly mounted within hub 78 by any means known to those skilled in the art, such as mechanical fasteners. Actuator 92 is configured to selectively rotate latch 64 about shaft 91 for disengaging latch 64 from recess 60 of wing 12. A pivot arm 85 extends from actuator 92. Actuator 92 is configured to rotate pivot arm 85 in a limited range in the directions indicated by the arrows in FIG. 4.

A trunnion 81 is fixedly and rotatably mounted to the projecting end of pivot arm 85. A linkage 87 is fixedly mounted to latch 64 and is slidably positioned within a hole (not shown) provided in trunnion 81. Trunnion 81 is configured to facilitate both rotation and translation of linkage 87 in the same plane as pivot arm 85. A collar 95 is fixedly mounted to one end of linkage 87 or is integrally formed on linkage 87. The collar 95 is incapable of sliding along the length of linkage 87. Rotating pivot arm 85 in a clockwise direction (see clockwise arrow), causes trunnion 81 to bear on collar 95, thereby causing linkage 87 to both translate and rotate. Linkage 87 consequently rotates latch 64 about shaft 91 in a clockwise direction thereby removing latch 64 from recess 60 of wing 12 to enable wings 12 and 14 to rotate about pivot axis 'A.' It should be understood that rotation of latch 64 does not cause rotation of shaft 91.

Upon pivoting wings 12 and 14 toward a deployed position, the pivot arm 85 of actuator 92 rotates in a counter-clockwise direction to return to its original, starting position. As pivot arm 85 rotates in a counter-clockwise direction, trunnion 81 merely slides along linkage 87. Linkage 87 does not translate as pivot arm 85 rotates in a counter-clockwise direction because there is no collar positioned on the other side of trunnion 81. Thus, rotating pivot arm 85 in a counter-clockwise direction does not cause rotation of latch 64 in a counter-clockwise direction. Upon pivoting wings 12 and 14 back to a stowed position, latch 64 ultimately snaps into recess 60 under its own spring force. Accordingly, actuator 92 is neither relied upon nor configured to rotate latch 64 in a counter-clockwise direction to a locked position.

Gearing assembly 94 facilitates rotation of wings 12 and 14 in a controlled manner. The gearing assembly may also be referred to herein as a drive mechanism. Gearing assembly 94 includes two gear shafts 103 and 105. Gears 46 and 100 are fixedly mounted to gear shaft 103 such that gears 46 and 100 rotate simultaneously. Similarly, gears 48 and 102 are fixedly mounted to gear shaft 105 such that gears 48 and 102 rotate simultaneously.

Each end of gear shaft 103 is mounted through a hole 99 (one shown) defined on top surface 80 and bottom surface 82 of hub 78. Similarly, each end of gear shaft 105 is mounted through a hole 101 (one shown) defined on top surface 80 and bottom surface 82 of hub 78, as indicated by the broken lines depicted in FIG. 4. In operation, gear shafts 103 and 105 rotate within holes 99 and 101. Although not shown, bearings may be provided in holes 99 and 101 to reduce friction between gear shafts 103 and 105 and their complimentary holes 99 and 101.

The teeth of intermediate gear 100 mesh with the teeth of intermediate gear 102 such that rotation of intermediate gear 100 causes rotation of intermediate gear 102 in an opposite rotational direction, and vice versa. It follows that rotation of gear 46 induces simultaneous rotation of gear 48 in an opposite rotational direction, and vice versa, by virtue of the engagement between the intermediate gears 100 and 102. Gears 46 and 48 extend through aperture 98 of hub 78 to engage gears 34 and 36 of wings 12 and 14, respectively.

Wings 12 and 14 are capable of pivoting under the dynamic forces of flight (such as hydro or aerodynamic flow energy), without the aid of a motor or other mechanism. Alternatively and although not shown, a motor may be coupled to either gear shaft 103 or gear shaft 105, for example, for actuating gearing assembly 94 to pivot wings 12 and 14 about pivot axis 'A.' The motor may be a linear or rotational actuator, for example, or any other apparatus known to those skilled in the art. Such a motor may be positioned within hub 78 or positioned within the fuselage of the vehicle. As another alternative, wings 12 and 14 may be torsionally-loaded via a gas spring, an electrical actuator, or any other apparatus known to those skilled in the art.

Figure 5:
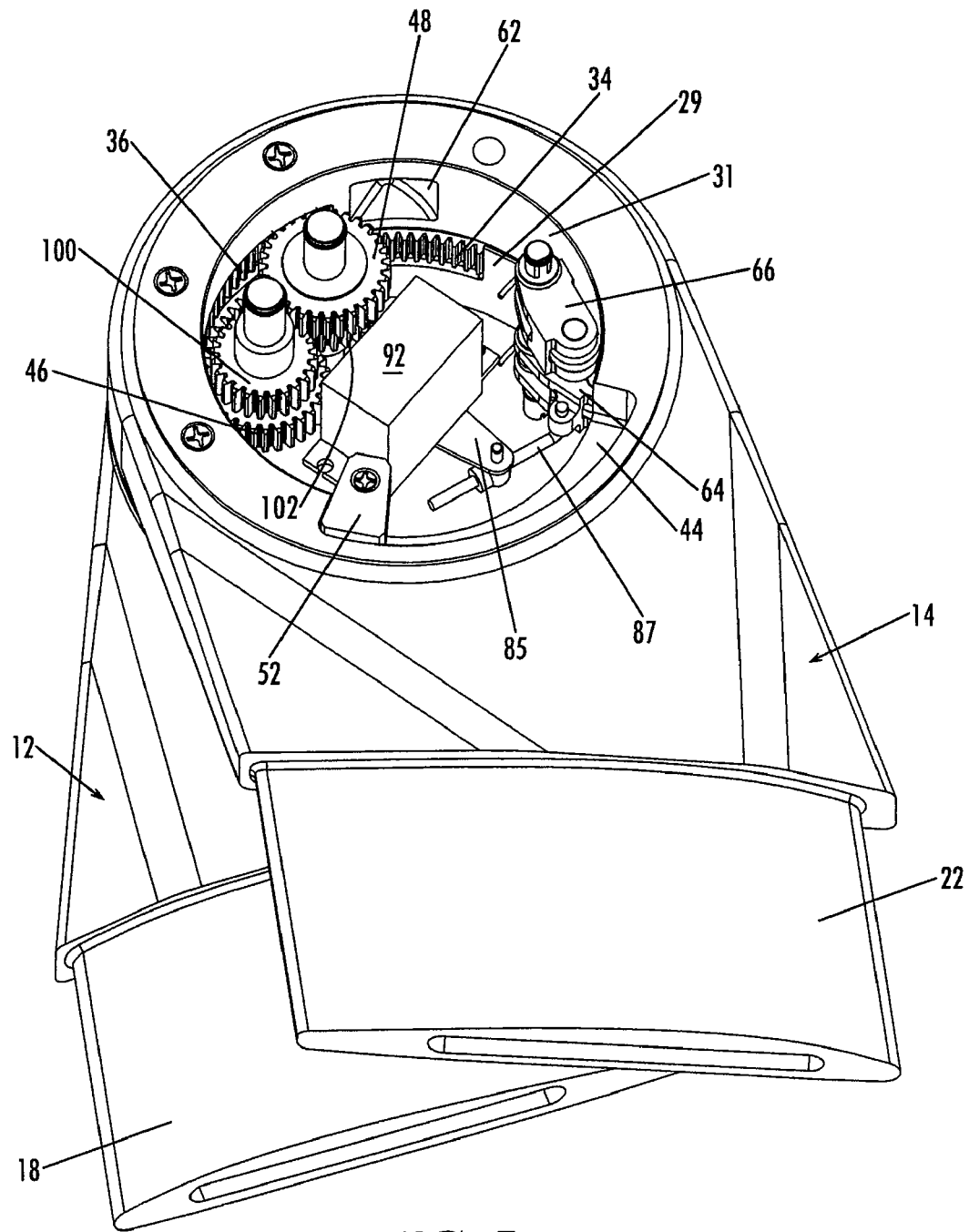
FIG. 5 depicts a perspective view of the pivoting wing assembly of FIG. 1A, wherein several components are omitted to reveal engagement between the gears of the hub assembly and the gears of the wings.

FIG. 5 depicts a perspective view of the wing assembly 10 in a stowed configuration, wherein hub 78 of hub assembly 16 has been omitted to reveal engagement between the gears 46 and 48 of hub assembly 16 and gears 34 and 36 of wings 12 and 14. As best shown in FIG. 5, gear 48 meshes with gear 36 of wing 14, gear 46 meshes with gear 34 of wing 12 and intermediate gear 100 meshes with intermediate gear 102. By virtue of the mechanical engagement between those gears, rotation of either gear 48 or gear 46 causes wings 12 and 14 to simultaneously pivot in opposite rotational directions about pivot axis 'A.'

In the stowed configuration depicted in FIG. 5, latch 64 is positioned within recess 60 (not shown) that is defined on the cylindrical interior surface of aperture 29. Engagement between latch 64 and recess 60 prevents rotation of wings 12 and 14 about pivot axis 'A.' Latch 66 is positioned against the cylindrical interior surface of aperture 31. Stop 52 is positioned against a terminal end of slot 44, thereby preventing wing 14 from pivoting in a counter-clockwise direction. Although not shown in FIG. 5, stop 50 is positioned against a terminal end of slot 42, thereby preventing wing 12 from pivoting in a clockwise direction.

Figure 6A:
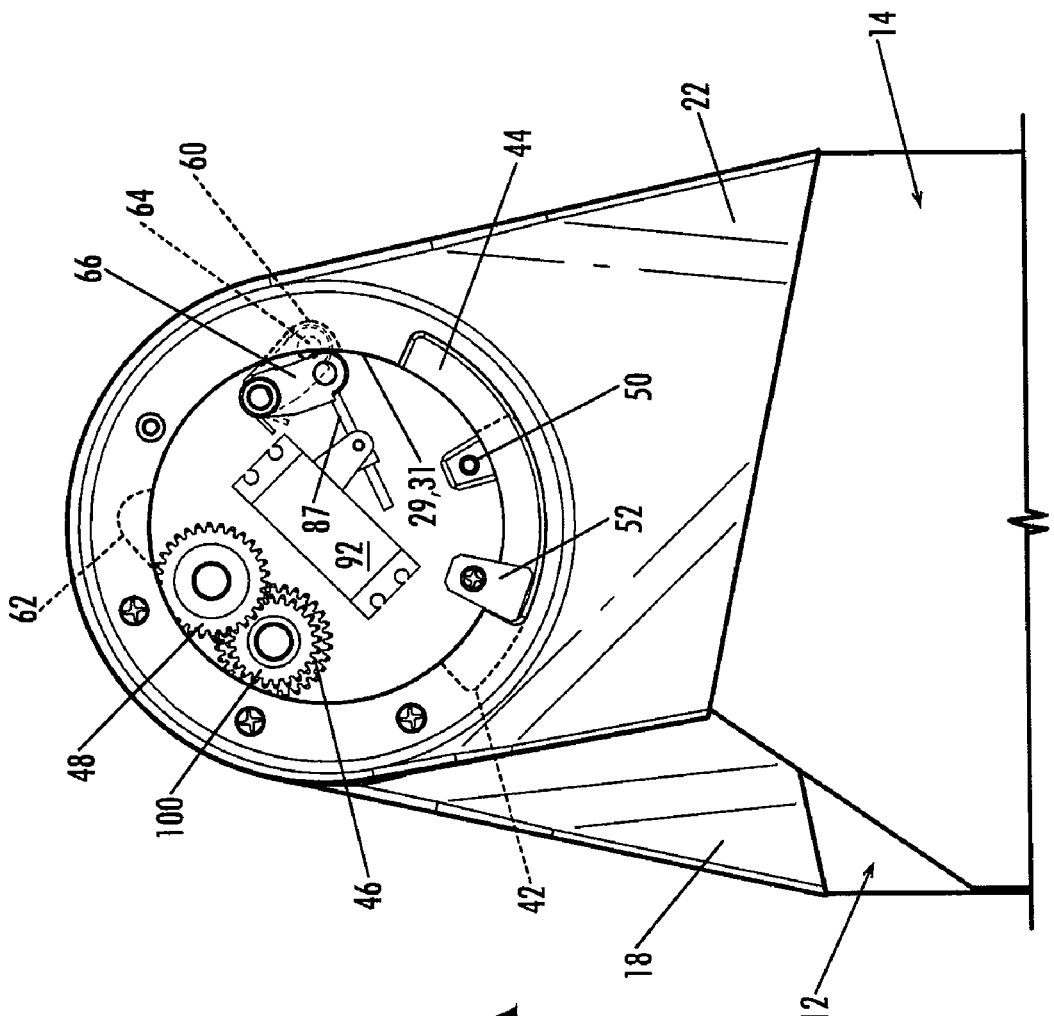
FIG. 6A depicts a top plan view of the wing assembly of FIG. 1A in a stowed configuration, wherein several components are omitted to reveal the locking engagement between the hub assembly and the wings.
Figure 6B:
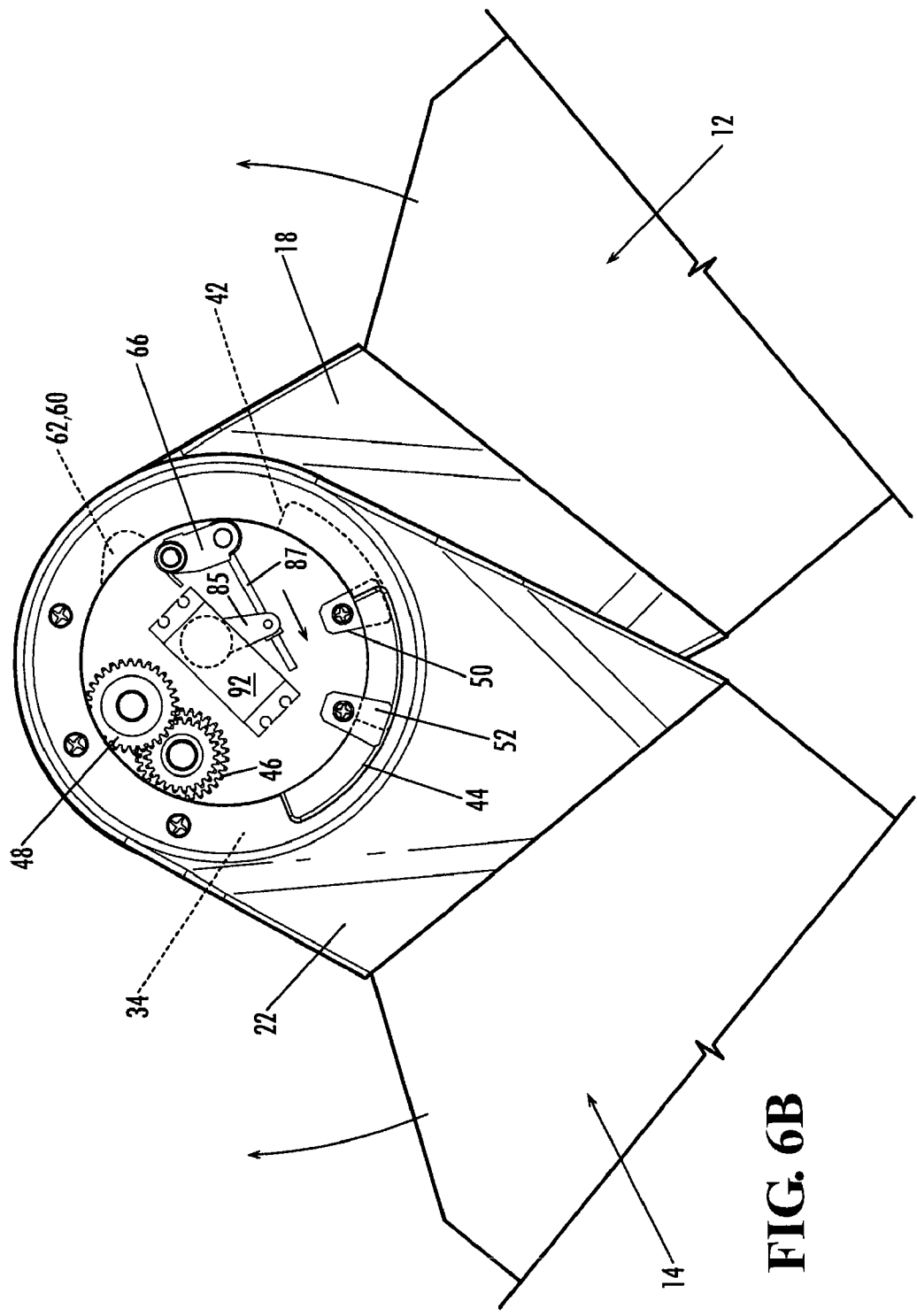
FIG. 6B depicts a top plan view of the partial wing assembly of FIG. 6A in a partially-deployed configuration.
Figure 6C:
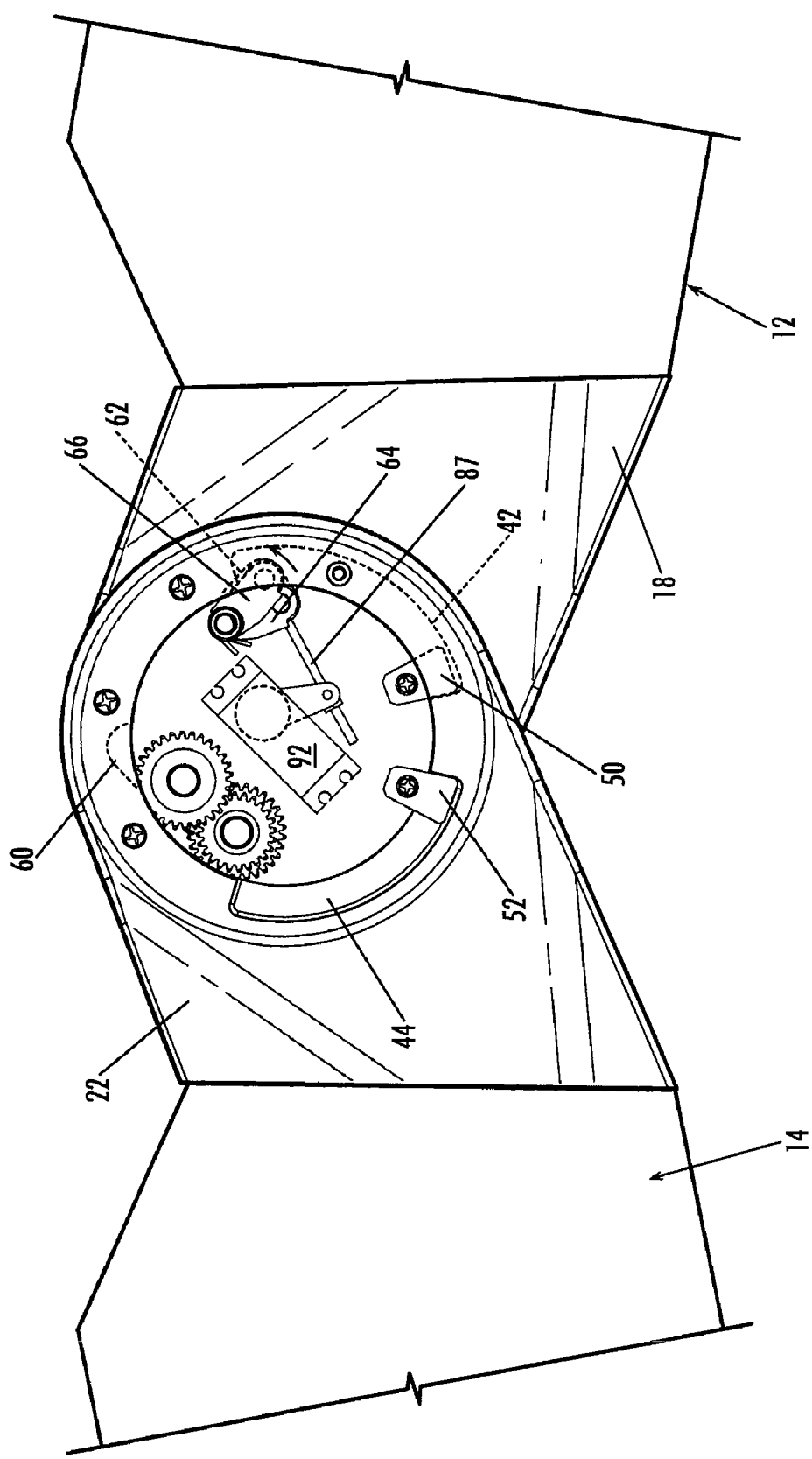
FIG. 6C depicts a top plan view of the partial wing assembly of FIG. 6A in a fully-deployed and locked configuration.

FIGS. 6A-6C depict top plan views of wing assembly 10 pivoting from a stowed configuration (FIG. 6A) to an intermediate configuration (FIG. 6B) and to a deployed configuration (FIG. 6C). In FIGS. 6A-6C, hub 78 of hub assembly 16 has been omitted to reveal mechanical engagement between hub assembly 16 and wings 12 and 14.

FIG. 6A depicts wing assembly 10 in a stowed configuration. In the stowed and locked configuration, stop 50 is positioned against a terminal end of slot 42 thereby preventing rotation of wing 12 in a clockwise direction, and stop 52 is positioned against a terminal end of slot 44 preventing rotation of wing 14 in a counter-clockwise direction. Latch 64 is positioned within recess 60 thereby preventing rotation of wing 12 in a counter-clockwise direction. Because intermediate gears 100 and 102 (not shown) mesh together and latch 64 prevents the rotation of wing 12 in a counter-clockwise direction, wing 14 is prevented from rotating in a clockwise direction. Latch 66 is positioned on the cylindrical interior surface of aperture 31.

FIG. 6B depicts a top plan view of the partial wing assembly of FIG. 6A in a partially-deployed and unlocked configuration. To pivot wings 12 and 14 from the stowed configuration of FIG. 6A to the partially-deployed configuration of FIG. 6B, actuator 92 rotates pivot arm 85 in a clockwise direction (as shown), thereby translating linkage 87 in the direction indicated by the arrow in FIG. 6B. Translating linkage 87 in the indicated direction removes latch 64 from recess 60. Thereafter, wings 12 and 14 are capable of simultaneously pivoting in opposite rotational directions about pivot axis 'A.'

Wings 12 and 14 pivot about axis 'A' as a result of either the dynamic forces of flight, a motive force rotating gear 46 and/or gear 48 or by loading wing 14 with a linear gas or electrical actuator in a crank fashion, etc. Pivoting of wings 12 and 14 causes rotation of gears 46 and 48, and, conversely, rotation of gears 46 and 48 causes wings 12 and 14 to pivot. More specifically, rotation of gears 46 and 48 causes rotation of gears 34 and 36, which causes wings 12 and 14 to pivot about axis 'A,' respectively. Stated another way, pivoting of wings 12 and 14 rotates gears 34 and 36 which rotates gears 46 and 48, respectively. As wings 12 and 14 pivot, the bearings 89 (see FIG. 4) of latches 64 and 66 translate along the cylindrical interior surfaces of apertures 29 and 31, and slots 42 and 44 travel over stops 50 and 52, respectively.

FIG. 6C depicts a top plan view of the partial wing assembly of FIG. 6A in a deployed (i.e., swept) and locked configuration. As wings 12 and 14 approach the fully-deployed configuration shown in FIG. 6C, latch 66 snaps into recess 62 under its own spring force, stop 50 abuts a terminal end of slot 42 thereby preventing rotation of wing 12 in a counter-clockwise direction, and stop 52 abuts a terminal end of slot 44 thereby preventing rotation of wing 14 in a clockwise direction. Once latch 66 is positioned within recess 62, wing 14 is prevented from rotating in a counter-clockwise direction. Because intermediate gears 100 and 102 (not shown) mesh together and latch 66 prevents the rotation of wing 14 in a counter-clockwise direction, wing 12 is prevented from rotating in a clockwise direction. Accordingly, wings 12 and 14 are locked in the deployed configuration shown in FIG. 6C.

To return wings 12 and 14 to a stowed or partially-deployed configuration, latch 66 is first removed from recess 62 by rotating shaft 91 (see FIG. 4) of latch assembly 90. As stated previously, latch 66 is keyed to shaft 91, whereas latch 64 is rotatably mounted to shaft 91. Rotation of shaft 91 causes latch 66 to rotate with the shaft 91 while latch 64 remains fixed in position. Upon rotating shaft 91 and thereby removing latch 66 from recess 62, wings 12 and 14 are capable of being pivoted back toward stowed configuration of FIG. 6A. Upon pivoting wings 12 and 14 toward a stowed configuration, latch 64 snaps into recess 60 under its own spring force, stop 50 abuts a terminal end of slot 42 thereby preventing rotation of wing 12 in a clockwise direction, and stop 52 abuts a terminal end of slot 44 thereby preventing rotation of wing 14 in a counter-clockwise direction.

The end of shaft 91 may be fitted with a variety of standard fastener drives such as Phillips head 110, flat head (as shown) or a Hex-Head. Alternatively, latch 66 may be coupled to actuator 92, or another actuator, for automatically removing latch 66 from recess 62. The actuator 92 and any other actuators may be controlled through a wired or wireless link by an end-user or a computer program, for example.

In the exemplary embodiment shown and described herein, the wings are capable of being locked in only the stowed and deployed configurations. In another exemplary embodiment not illustrated herein, the wings are capable of being locked in more than two configurations. To achieve more than two locked configurations, at least two recesses are defined along the surface of apertures 29 and 31 of wings 12 and 14, respectively. In such an exemplary embodiment, latches 64 and 66 sequentially snap into those recesses as wings 12 and 14 pivot about axis 'A,' respectively.

Although the invention is illustrated and described herein with reference to specific embodiments, the invention is not intended to be limited to the details shown. Rather, various modifications may be made in the details within the scope and range of equivalents of the claims and without departing from the invention. The invention is not limited to aircrafts and may be suitable for other vehicles, such as compressible airborne vehicles, compressible undersea vehicles, variable sweep airborne vehicles or variable sweep undersea vehicles. Moreover, the invention may be arranged for any flight surface, angle of sweep or for oblique configurations.

What is claimed:

1. A wing pivot mechanism that is configured to pivot two wings about a single pivot axis of a vehicle, said wing pivot mechanism comprising:
   a hub assembly including a hub defining a hollow interior region and a set of gears positioned at least partially within the interior region of the hub, wherein a longitudinal axis of the hub is substantially coincident with the single pivot axis;
   two wings that are rotatably connected to the hub assembly, wherein each wing includes a gear surface that engages a gear of the hub assembly such that rotation of the gears of the hub assembly causes rotation of the gears of the wings and pivoting of the wings in opposite rotational directions about the single pivot axis between a stowed position and a deployed position; and
   a releasable locking mechanism for locking the wings in a fixed rotational position in both the deployed position and the stowed position;
   wherein each wing defines a cylindrical aperture and a longitudinal axis of the cylindrical apertures are positioned in alignment with the single pivot axis;
   the hub assembly is positioned within the cylindrical aperture of both wings, and the wings pivot about the hub assembly; and
   the releasable locking mechanism is positioned on the hub assembly and is configured to releasably engage a recess disposed within one or both of the wings.

2. The wing pivot mechanism of claim 1, wherein the hub assembly further comprises an actuator for releasing the locking mechanism from the recess of the wings to enable the wings to pivot about the pivot axis.

3. The wing pivot mechanism of claim 1 further comprising a stop disposed on either the hub assembly or the wings for preventing the rotation of both wings about the pivot axis beyond a pre-determined rotational range.

4. The wing pivot mechanism of claim 3, wherein the stop is either positioned on or extends from the hub assembly and is positioned within a slot formed in a wing, wherein terminal ends of the slot delimit rotation of the wings.

5. The wing pivot mechanism of claim 1, wherein a height dimension of the hub assembly is substantially equal to a total cumulative thickness of both wing roots.

6. A wing pivot mechanism that is configured to pivot two wings about a single pivot axis of a vehicle, said wing pivot mechanism comprising:
   a hub that is positioned along the single pivot axis;
   two wings that are rotatably connected to the hub assembly, wherein each wing defines a cylindrical aperture through which the hub assembly is positioned;
   a drive mechanism positioned at least partially within an interior region of the hub to enable pivoting of the wings in opposite rotational directions about the single pivot axis between a stowed position and a deployed position; and
   a stop disposed on either the hub or the wings for preventing the rotation of both wings about the pivot axis beyond a pre-determined rotational range;
   wherein the stop is either positioned on or extends from the hub and is positioned within a slot formed in a wing, wherein terminal ends of the slot delimit rotation of the wings.

7. The wing pivot mechanism of claim 6 further comprising a gear surface that is either formed on the respective wing or extends from the respective wing,
   wherein the drive mechanism comprises a set of gears positioned at least partially within the interior region of the hub, and
   wherein each gear of the gear set is configured to engage a gear of a respective wing such that rotation of the gears of the hub causes rotation of the gears of the wings and pivoting of the wings about the single pivot axis in opposite rotational directions between the stowed position and the deployed position.

8. The wing pivot mechanism of claim 6 further comprising a releasable locking mechanism for locking the wings in a fixed rotational position in both the deployed position and the stowed position.

9. The wing pivot mechanism of claim 8, wherein the releasable locking mechanism is positioned on the hub and is configured to releasably engage a recess disposed within one or both of the wings.

10. The wing pivot mechanism of claim 9, wherein the hub further comprises an actuator for releasing the locking mechanism from the recess of the wings to enable the wings to pivot about the pivot axis.

11. The wing pivot mechanism of claim 6, wherein a height dimension of the hub is substantially equal to a total cumulative thickness of both wing roots.

* * * * *